(12) United States Patent
Johnson

(10) Patent No.: US 11,396,791 B2
(45) Date of Patent: Jul. 26, 2022

(54) EQUALIZING CARTRIDGE FOR A FLAPPER VALVE

(71) Applicant: Jeffrey Johnson, Bixby, OK (US)

(72) Inventor: Jeffrey Johnson, Bixby, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 72 days.

(21) Appl. No.: 16/983,029

(22) Filed: Aug. 3, 2020

(65) Prior Publication Data

US 2022/0034425 A1    Feb. 3, 2022

(51) Int. Cl.
*E21B 34/10* (2006.01)
*E21B 34/12* (2006.01)
*F16K 1/20* (2006.01)
*F16K 39/02* (2006.01)

(52) U.S. Cl.
CPC ............ *E21B 34/101* (2013.01); *E21B 34/12* (2013.01); *F16K 1/20* (2013.01); *F16K 39/024* (2013.01); *E21B 2200/05* (2020.05)

(58) Field of Classification Search
CPC .... E21B 34/12; E21B 2200/05; F16K 39/024; F16K 1/20; F16K 15/025; F16K 15/033; F16K 15/063; F16K 15/10; F16K 15/12
USPC ....................................................... 251/336
See application file for complete search history.

(56) References Cited

U.S. PATENT DOCUMENTS

| | | | | |
|---|---|---|---|---|
| 4,415,036 A * | 11/1983 | Carmody | .............. | E21B 34/101 166/324 |
| 4,475,599 A * | 10/1984 | Akkerman | ............ | E21B 34/101 166/323 |
| 4,478,286 A | 10/1984 | Fineberg | | |
| 6,079,497 A * | 6/2000 | Johnston | ................ | E21B 34/101 166/324 |
| 6,283,217 B1 * | 9/2001 | Deaton | .................. | E21B 34/101 166/332.7 |
| 6,296,061 B1 * | 10/2001 | Leismer | ................ | E21B 34/101 166/386 |
| 6,644,408 B2 * | 11/2003 | Ives | ...................... | F16K 1/2014 166/332.7 |
| 6,848,509 B2 * | 2/2005 | Myerley | ............... | E21B 34/101 166/332.7 |

(Continued)

OTHER PUBLICATIONS

International Search Report and Written Opinion for International Application No. PCT/US2021/071046; International Filing Date Jul. 29, 2021; Report dated Nov. 8, 2021 (pp. 1-11).

*Primary Examiner* — Michael R Wills, III

(74) *Attorney, Agent, or Firm* — Cantor Colburn LLP

(57) ABSTRACT

A one-way valve for use in a wellbore includes a housing having a longitudinal axis defining a flow bore. A valve seat is arranged in the housing along the flow bore. A flapper member is pivotally supported in the housing between a closed position and an open position. The flapper member includes a first side having a sealing surface that selectively engages the valve seat in the closed position and an opposing second side. The flapper member also includes a central portion that is aligned with the longitudinal axis in the closed portion and a passage extending through the flapper member. An equalizing cartridge is arranged in the passage. The equalizing cartridge includes an equalizing housing and an equalizing plunger including an activation end provided at the first side of the flapper member.

14 Claims, 8 Drawing Sheets

(56) References Cited

U.S. PATENT DOCUMENTS

| | | | |
|---|---|---|---|
| 6,877,564 B2* | 4/2005 | Layton | F16K 31/54 |
| | | | 166/332.8 |
| 7,204,313 B2* | 4/2007 | Williams | F16K 15/1821 |
| | | | 166/324 |
| 7,645,131 B2* | 1/2010 | Hajdúch | B29D 30/0662 |
| | | | 425/28.1 |
| 7,665,529 B2* | 2/2010 | Farquhar | E21B 33/068 |
| | | | 166/374 |
| 7,841,416 B2 | 11/2010 | Henschel et al. | |
| 8,056,618 B2 | 11/2011 | Wagner et al. | |
| 8,701,781 B2* | 4/2014 | Henschel | E21B 34/101 |
| | | | 166/373 |
| 9,163,479 B2* | 10/2015 | Rogers | E21B 34/066 |
| 9,255,463 B2* | 2/2016 | Megill | E21B 34/101 |
| 2004/0060704 A1* | 4/2004 | Layton | E21B 34/06 |
| | | | 166/332.8 |
| 2006/0151177 A1 | 7/2006 | Williams et al. | |
| 2012/0111575 A1 | 5/2012 | Henschel et al. | |
| 2020/0256159 A1* | 8/2020 | Vick, Jr. | F16K 17/0486 |

* cited by examiner

EQUALIZING CARTRIDGE FOR A FLAPPER VALVE

BACKGROUND

In the resource exploration and recovery industry boreholes are formed to provide access to a resource bearing formation. A one-way valve is often deployed into a wellbore to prevent undesired flow from a formation to a surface system. The one-way valve typically is embodied in a sub-surface safety valve (SSSV) that includes a flapper member. The flapper member pivots about an arc between a closed position and an open position. A spring or other biasing member urges the flapper member toward the closed position. As such, the SSSV is a normally closed valve that is selectively opened in order to treat the wellbore and/or withdraw formation fluids.

The flapper member is typically opened by passing a tubular through the SSSV. Before opening, pressure above and below the flapper must be equalized. In some cases, pressure may be applied uphole of the flapper member and increased to match the pressure downhole of the flapper member. Once there is an equilibrium, the tubular may pass through and open the flapper member. In other cases, the flapper member includes a pressure relief poppet. An opening is milled in the flapper member, a valve seat is machined, and a poppet is installed. The poppet may be unseated by contact pressure from a tubular member from above the flapper.

While both options are effective, increasing pressure uphole of the SSSV to match pressure below the SSSV requires the use of large pumps and appropriate fittings that may increase an overall cost of operation. Milling openings and machining a valve seat in the flapper member itself is a time consuming operation that requires strict tolerances be held in order to ensure a desired seal. Accordingly, the industry would welcome a system for equalizing pressure across a flapper member that leads to reduced costs and complexity.

SUMMARY

Disclosed is a one-way valve for use in a wellbore including a housing having a longitudinal axis defining a flow bore. A valve seat is arranged in the housing along the flow bore. A flapper member is pivotally supported in the housing between a closed position and an open position. The flapper member includes a first side having a sealing surface that selectively engages the valve seat in the closed position and an opposing second side. The flapper member also includes a central portion that is aligned with the longitudinal axis in the closed portion and a passage extending through the flapper member. An equalizing cartridge is arranged in the passage. The equalizing cartridge includes an equalizing housing and an equalizing plunger including an activation end provided at the first side of the flapper member.

Also disclosed is a resource exploration and recovery system including a surface system and a subsurface system including a tubular string extending into a formation. The tubular string is formed from one or more tubulars. At least one of the one or more tubulars supports a one-way valve including a housing having a longitudinal axis defining a flow bore. A valve seat is arranged in the housing along the flow bore. A flapper member is pivotally supported in the housing between a closed position and an open position. The flapper member includes a first side having a sealing surface that selectively engages the valve seat in the closed position and an opposing second side. The flapper member also includes a central portion that is aligned with the longitudinal axis in the closed portion and a passage extending through the flapper member. An equalizing cartridge is arranged in the passage. The equalizing cartridge includes an equalizing housing and an equalizing plunger including an activation end provided at the first side of the flapper member Further disclosed is a method of equalizing pressure across a one-way valve including shifting a flow tube toward a flapper member of the one-way valve, engaging, with the flow tube, an activation end of an equalizing plunger arranged in an equalizing housing provided in the flapper member, unseating the equalizing plunger from the equalizing housing, equalizing pressure across the one-way valve, and opening the flapper member with the flow tube.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
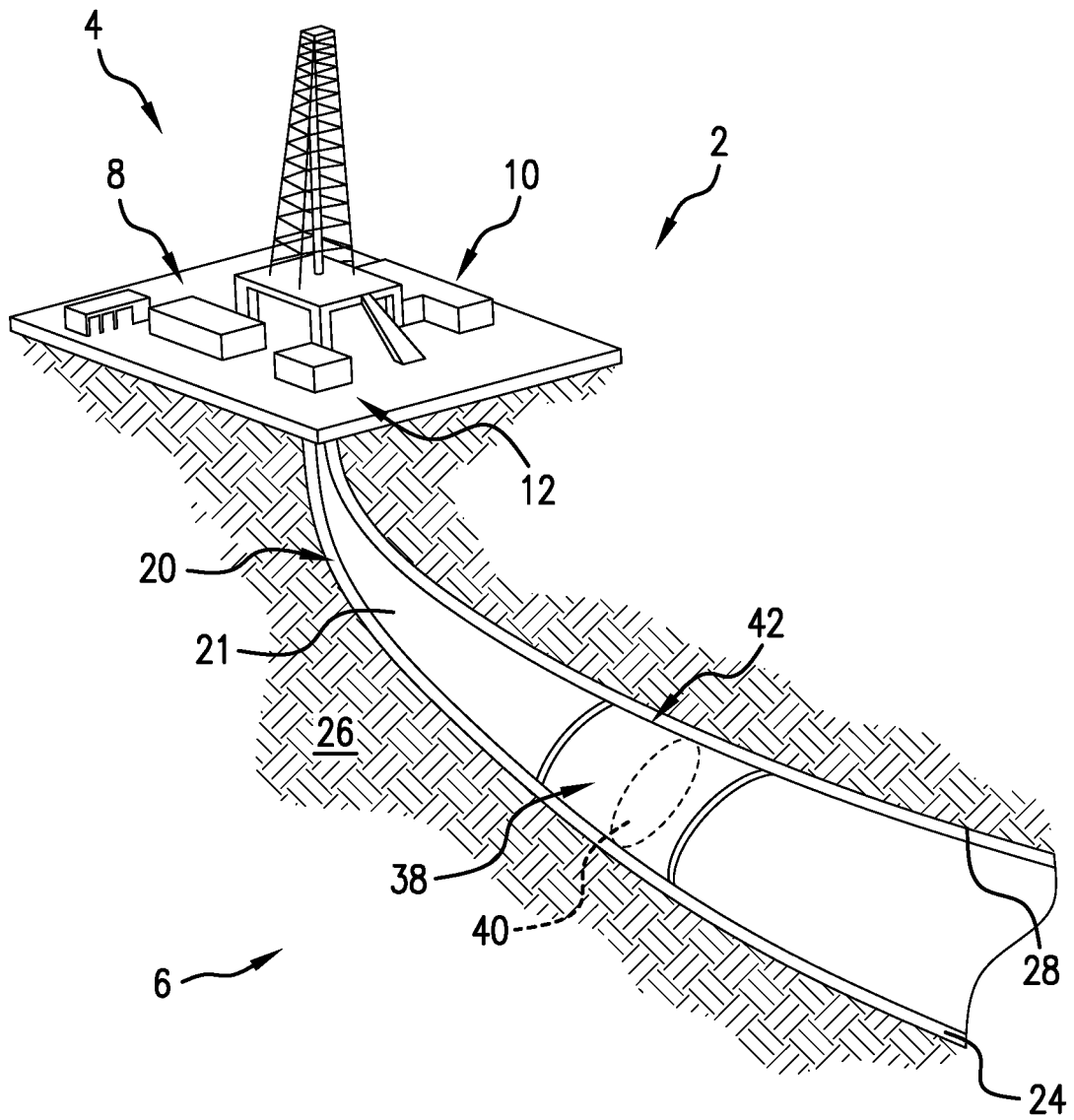
FIG. 1 depicts a resource exploration and recovery system including a flapper valve having an integrated equalizing cartridge, in accordance with an aspect of an exemplary embodiment.

A resource exploration and recovery system, in accordance with an exemplary embodiment, is indicated generally at 2, in FIG. 1. Resource exploration and recovery system 2 should be understood to include well drilling operations, resource extraction and recovery, $CO_2$ sequestration, and the like. Resource exploration and recovery system 2 may include a first system 4 which, in some environments, may take the form of a surface system operatively and fluidically connected to a second system 6 which, in some environments, may take the form of a downhole or subsurface system. First system 4 may include pumps 8 that aid in completion and/or extraction processes as well as fluid storage 10. Fluid storage 10 may contain a stimulation fluid which may be introduced into second system 6. First system 4 may also include a control system 12 that may monitor and/or activate one or more downhole operations.

Second system 6 may include a tubular string 20 formed from one or more tubulars, such as indicated at 21 that is extended into a wellbore 24 formed in formation 26. Wellbore 24 includes an annular wall 28 which may be defined by a surface of formation 26 or a casing tubular (not shown). Tubular string 20 includes a subsurface safety valve (SSSV) 38 including a flapper valve system 40 coupled to tubular 21. SSSV 38 includes a valve housing 42 including a flow bore (not separately labeled) and which supports a plurality of valve components as will be discussed herein.

Figure 2:
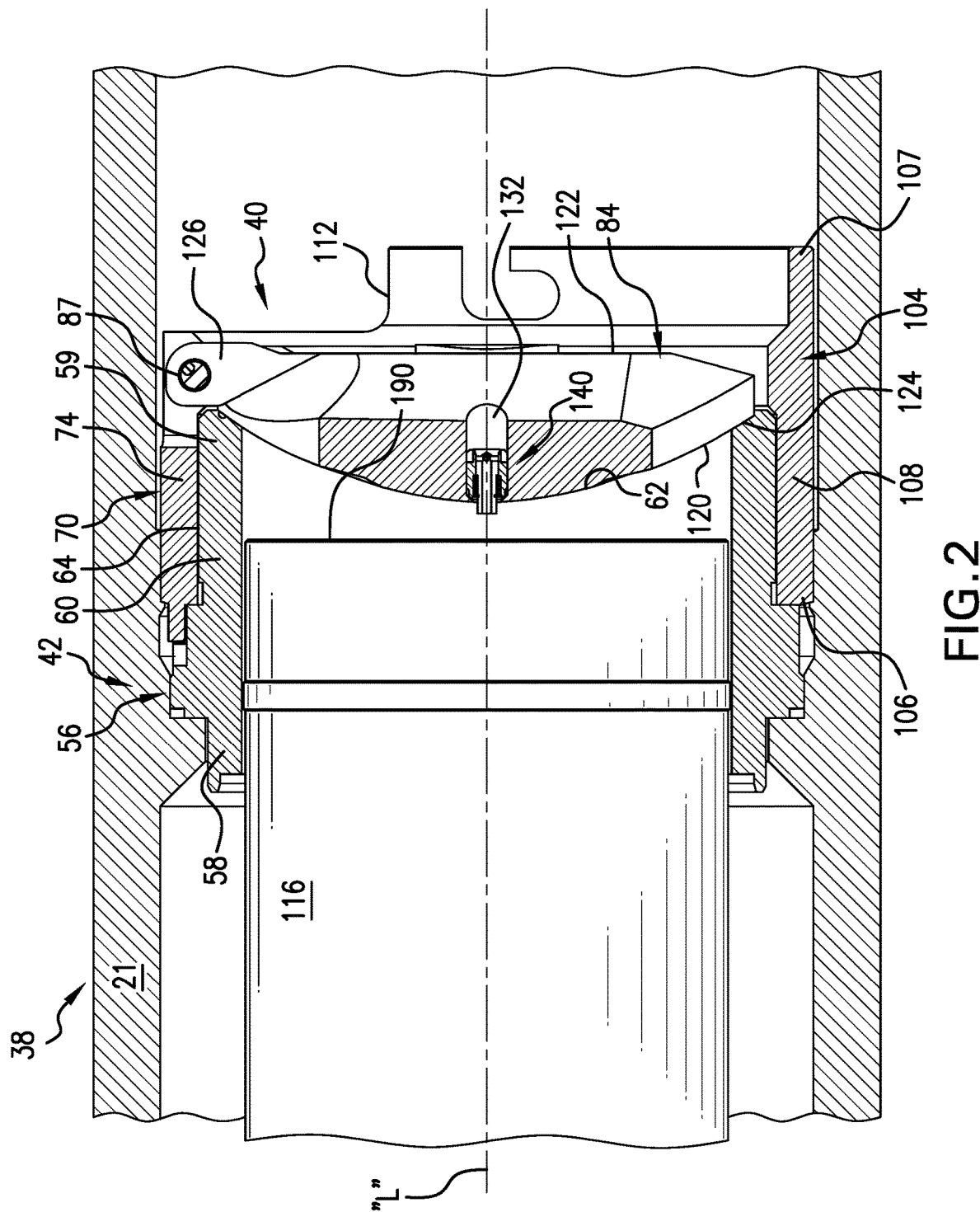
FIG. 2 depicts a cross-sectional view of the flapper valve in a closed configuration, in accordance with an exemplary embodiment.
Figure 8:
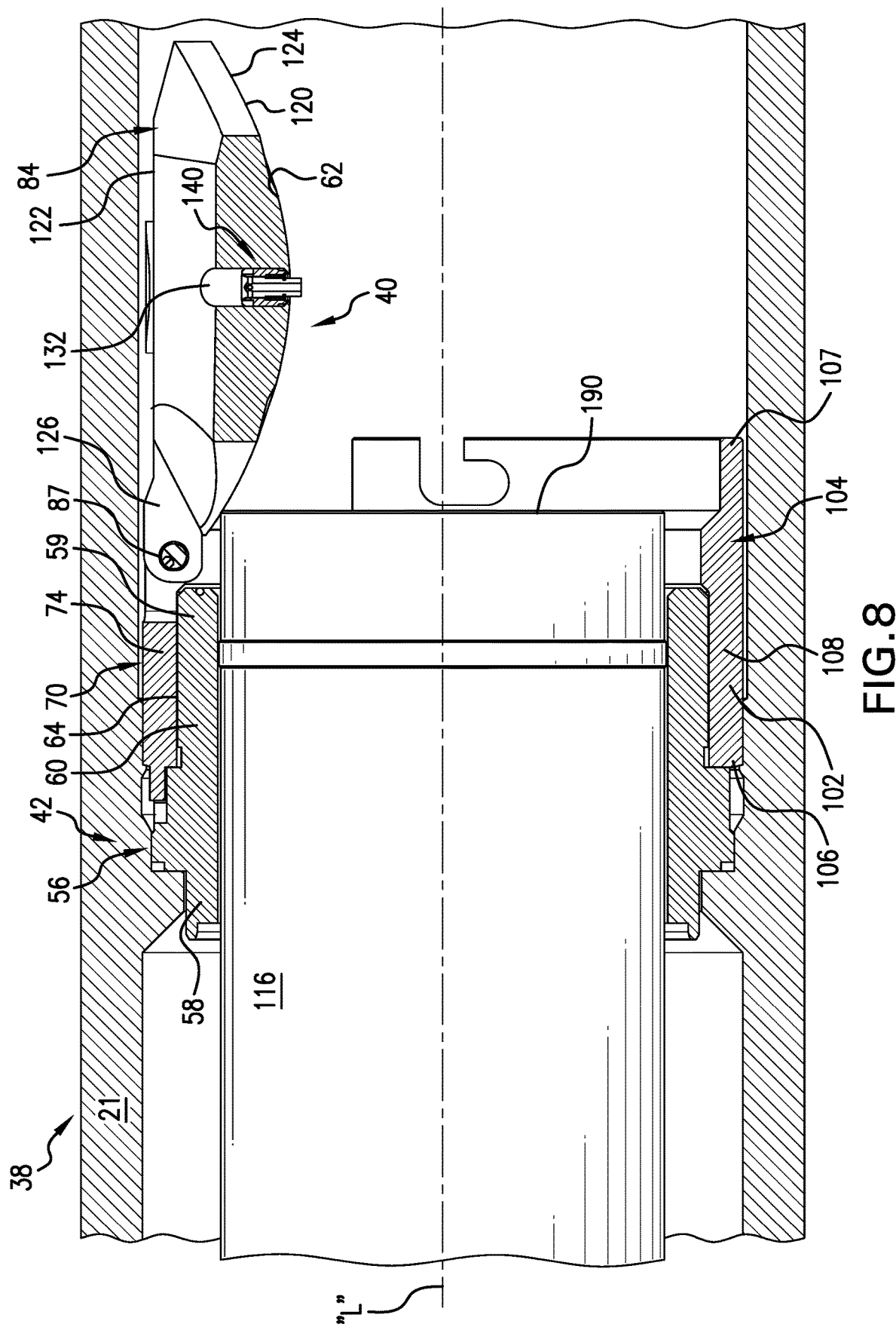
FIG. 8 depicts a cross-sectional view of the flapper valve of FIG. 2 in an open configuration following operation of the equalizing valve, in accordance with an exemplary embodiment.

Referencing FIG. 2, valve housing 42 surrounds a closure mechanism 56 having a first end section 58, a second end section 59 and an intermediate section 60 extending therebetween. Closure mechanism 56 includes a central longitudinal axis "L". Second end section 59 includes a valve seat 62 defining an opening (not separately labeled). Intermediate section 60 includes an outer surface 64. A flapper base 70 mechanically connects valve housing 42 to closure mechanism 56. Flapper base 70 includes a section 74 connected to outer surface 64. A flapper member 84 is connected to flapper base 70 through a hinge 87. Flapper member 84 is selectively shiftable between a first or closed configuration (FIG. 2) and a second or open configuration (FIG. 8).

In accordance with an aspect of an exemplary embodiment, flapper base 70 includes a body 104 having a first end 106, a second end 107 and an intermediate portion 108 extending therebetween. Second end 107 may define an outlet. An opening 112 is formed in flapper base 70 and is receptive to flapper member 84. As will be detailed herein, a flow tube 116 is selectively shifted along central longitudinal axis "L" and passed through SSSV 38 in order to open a flow path to first system 4.

Figure 3:
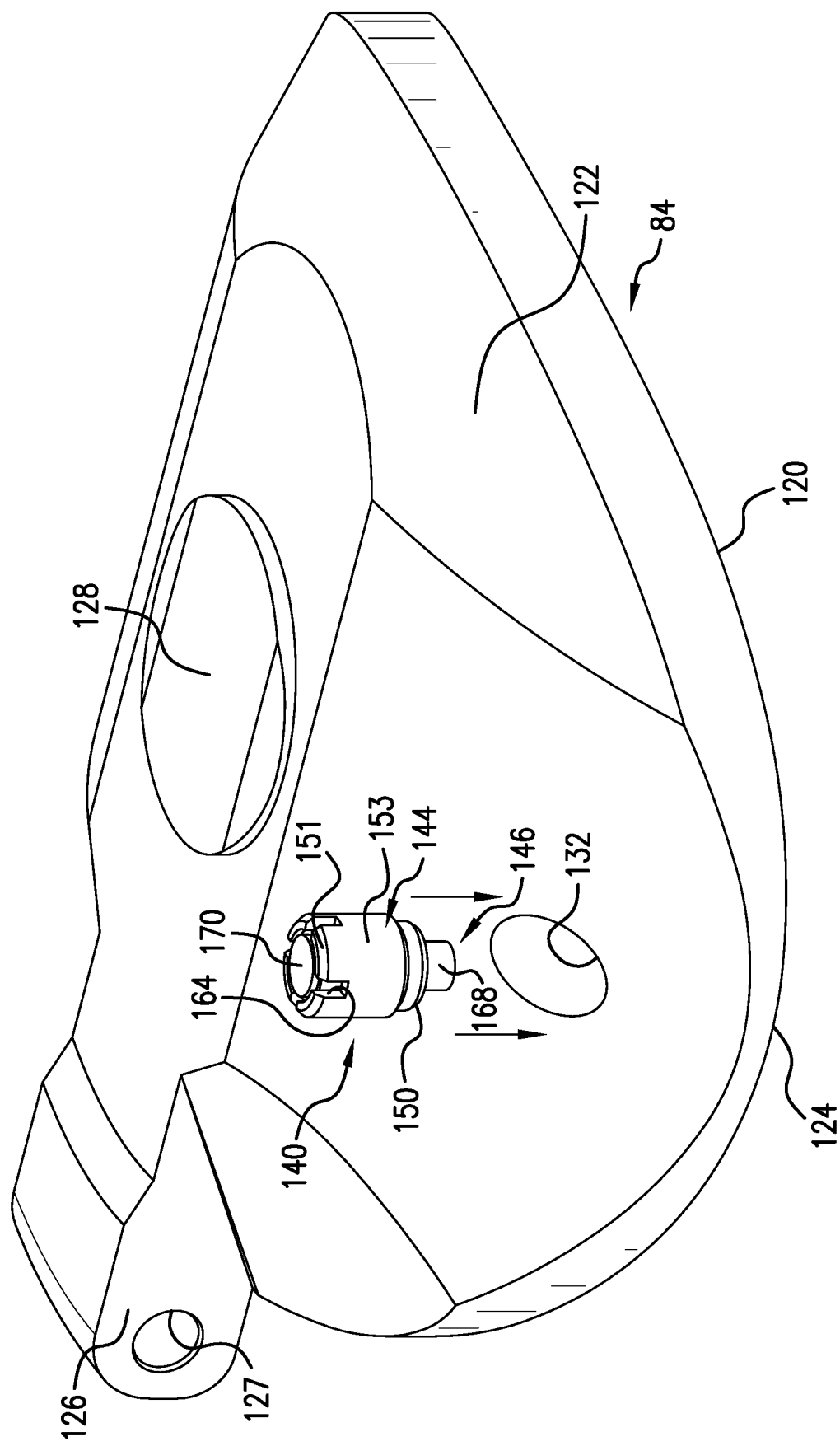
FIG. 3 depicts a perspective view of the flapper of the flapper valve of FIG. 2, in accordance with an aspect of an exemplary embodiment.

Referring to FIG. 3, and with continued reference to FIG. 2, flapper member 84 includes a first side 120 and an opposing second side 122. First side 120 includes a sealing surface 124. A projection 126 extends radially outwardly of flapper member 84 and engages with hinge 87. Projection 126 includes an opening 127 that receives a hinge pin (not separately labeled) thereby forming hinge 87. Flapper member 84 includes a central portion 128 that is aligned with central longitudinal axis "L". A passage 132 extends from first side 120 through second side 122 radially offset from central portion 128. An equalizing cartridge 140 is arranged in passage 132. Equalizing cartridge 140 is selectively opened to equalize pressure across SSSV 38 prior to opening flapper member 84. Equalizing cartridge 140 may be press-fit into passage 132 or, in other embodiments, may be connected to flapper member 84 though a threaded connection or other form of mechanical interface.

Figure 4:
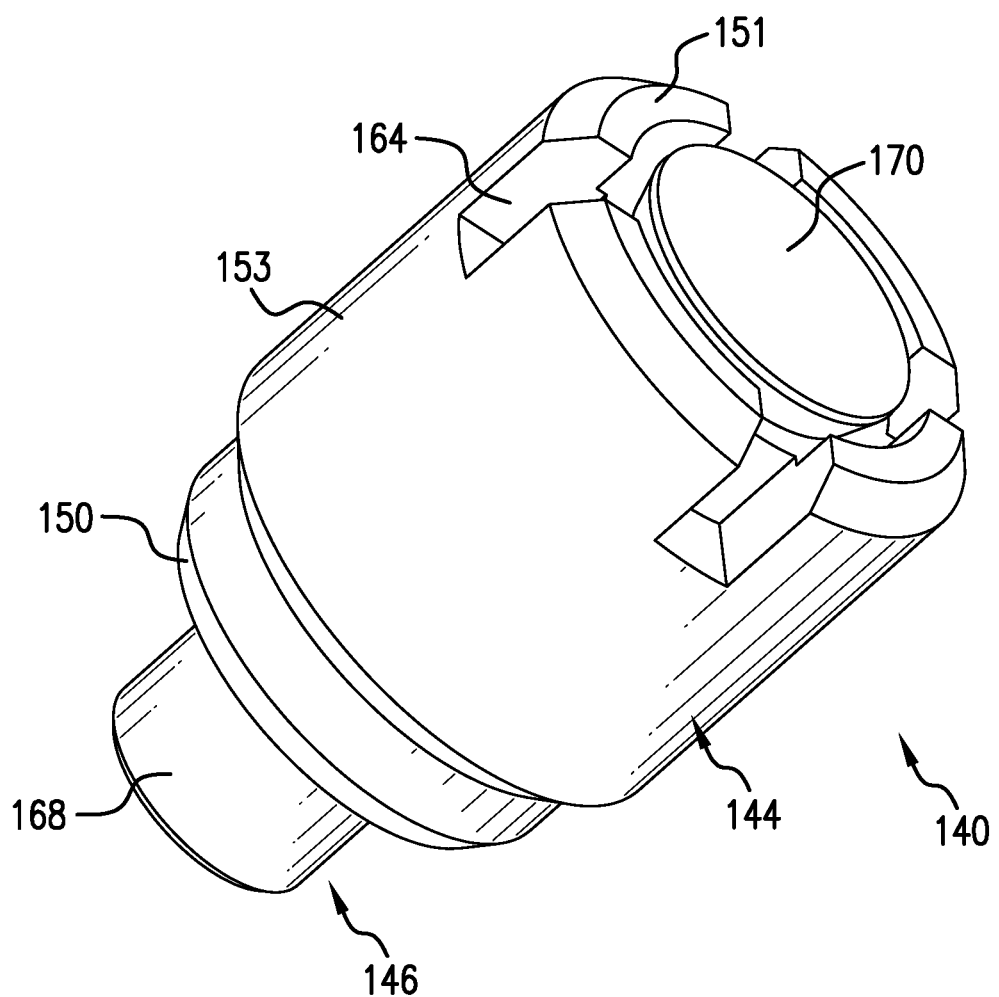
FIG. 4 depicts the equalizing valve, in accordance with an exemplary embodiment.
Figure 5:
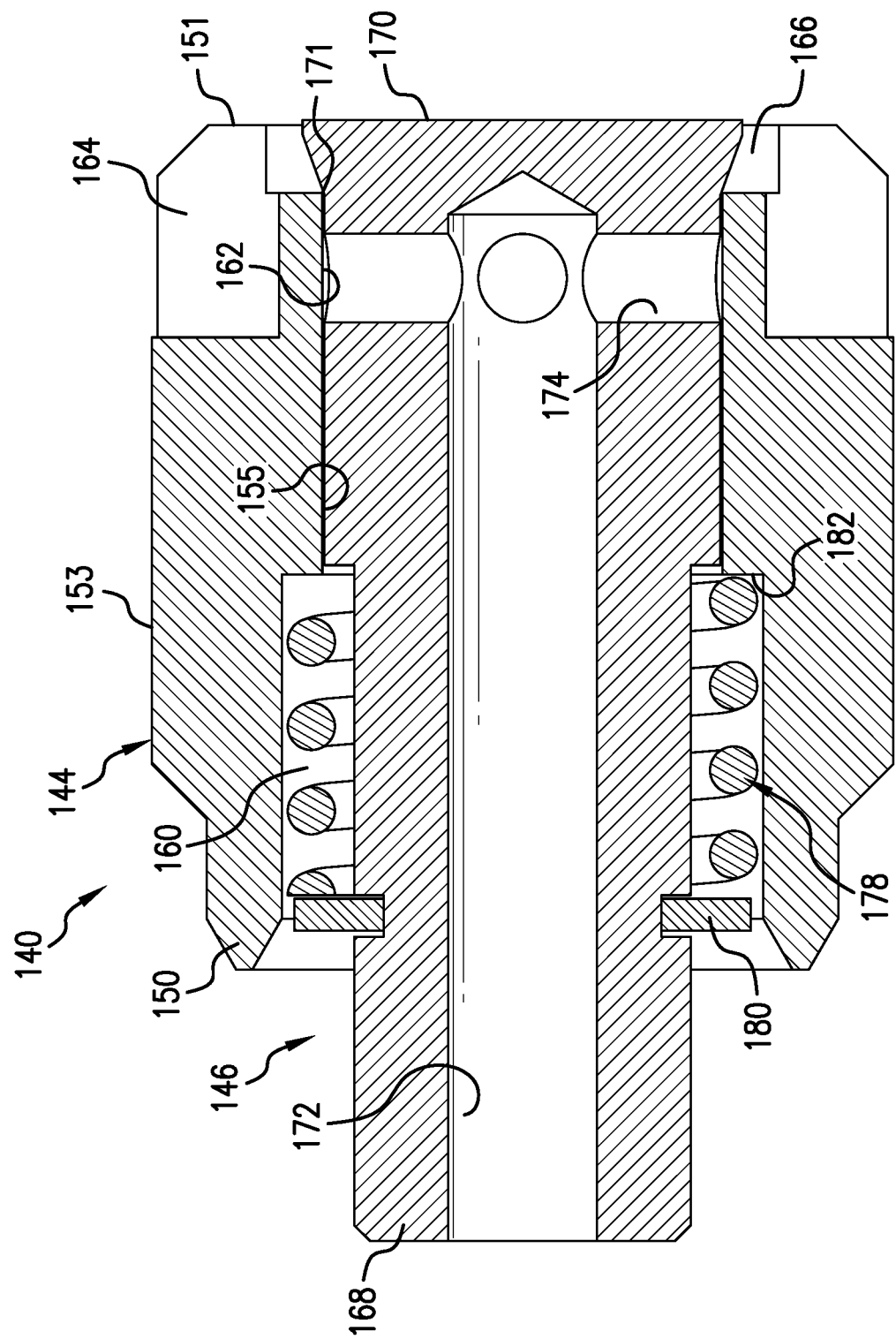
FIG. 5 depicts a cross-sectional view of the equalizing valve of FIG. 4 in a closed configuration, in accordance with an exemplary aspect.
Figure 6:
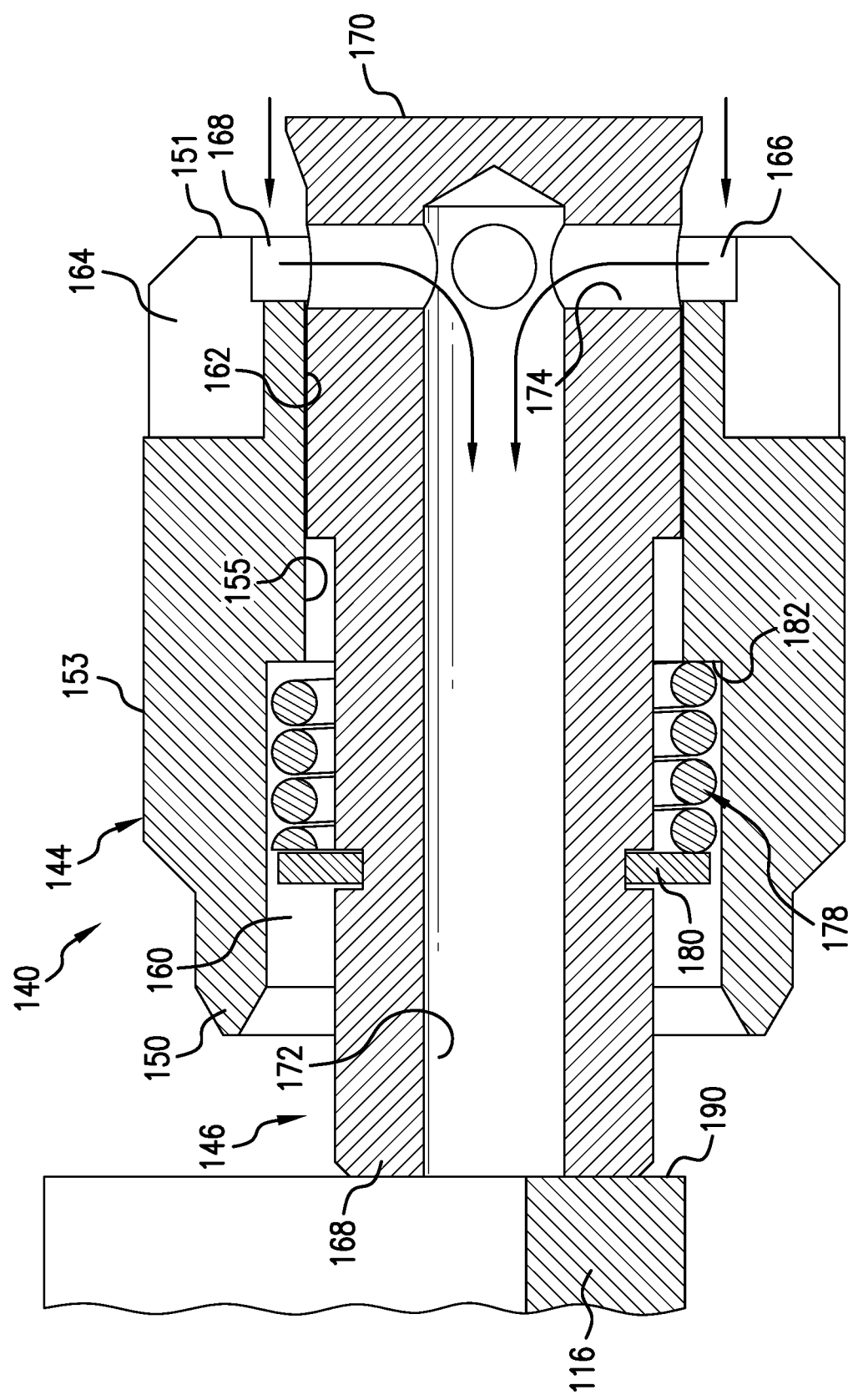
FIG. 6 depicts a cross-sectional view of the equalizing valve of FIG. 5 in an open configuration, in accordance with an exemplary aspect.

Reference will now follow to FIGS. 4-6 and with continued reference to FIGS. 2-3, in describing equalizing cartridge 140 in accordance with an exemplary aspect. Equalizing cartridge 140 includes an equalizing housing 144 that supports an equalizing plunger 146. Equalizing housing 144 includes a first end section 150 and a second end section 151. An outer surface section 153 and an inner surface section 155 extend between first end section 150 and second end section 151. Inner surface section 155 defines a conduit (not separately labeled) that receives equalizing plunger 146. The conduit passing through equalizing housing 144 includes a first portion 160 having a first diameter and a second portion 162 having a second diameter that is smaller than the first diameter. Second end section 151 is shown to include a plurality of castellations 164 that may be used as a tool interface for installing equalizing cartridge 140 into passage 132. Second end section 151 also includes a recess 166.

Equalizing plunger 146 includes an activation end 168 and an inlet end 170. An axial passage 172 extends from activation end 168 toward inlet end 170. A seal 171 is established at a contact point between equalizing plunger 146 and equalizing housing 144. A plurality of radial passages, one of which is indicated at 174 extends from axial passage 172 through inlet end 170. Radial passages 174 allow fluid to flow into equalizing cartridge 140 when equalizing plunger 146 is shifted. The fluid passes from activation end 168 via axial passage 172. Equalizing plunger 146 is normally closed and held so by a biasing member 178 that is restrained between a retaining ring 180 and a step 182 formed in equalizing housing 144 at an interface 182 of first portion 160 and second portion 162. A retainer mechanism (depicted as a groove in 146, but could include threaded or other mechanically attached means) prevents retaining ring 180 from passing through first end 150 of equalizing housing 144.

In an embodiment, prior to initiating production, SSSV 38 is opened. However, prior to opening SSSV 38 it is necessary to equalize pressure across flapper member 84. That is, pressure in formation 36 downhole of SSSV 38 is higher than pressure uphole of SSSV 38. As such, without equalizing pressure across SSSV 38 opening flapper member 84 may require a great deal of force. The force needed to open flapper member 84 could cause damage to components of flapper valve system 40.

Figure 7:
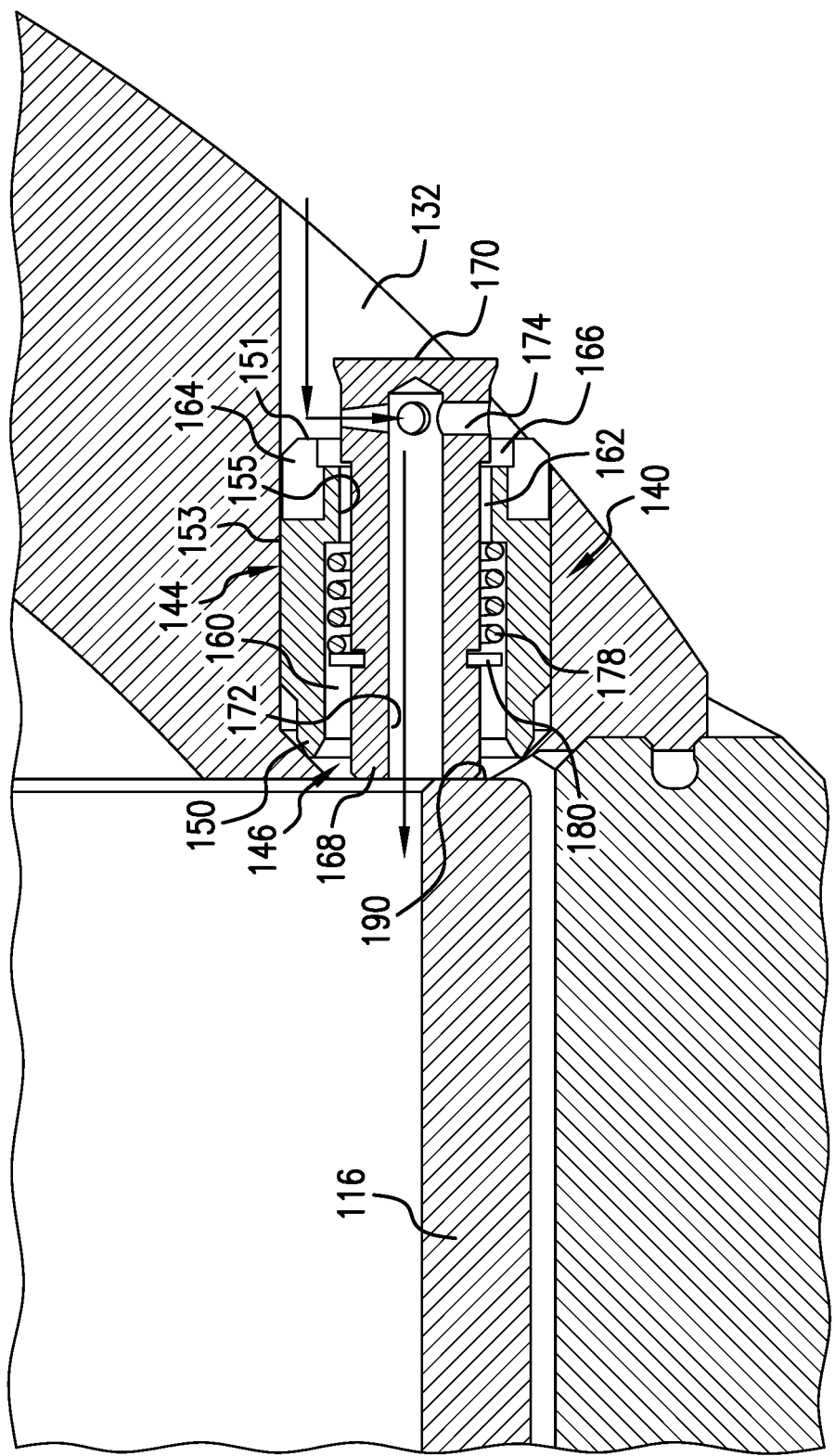
FIG. 7 depicts a cross-sectional view of the flapper valve of FIG. 2 showing a flow tube engaging with the equalizing valve.

As shown in FIG. 7, before SSSV 38 is opened, a terminal end 190 of flow tube 116 is shifted toward flapper member 84. Terminal end 190 engages activation end 168 shifting equalizing plunger 146 in equalizing housing 144 exposing radial passages 174 to pressure downhole of SSSV 38. Pressure flows through equalizing plunger 146 and, once pressure below flapper member 84 is below a predetermined level, flow tube is shifted further into closure mechanism 56 opening flapper member 84 and allowing fluids to flow toward first system 4 as shown in FIG. 8. By installing an equalizing cartridge into the flapper, the need for additional machining and tolerance maintained for forming a valve directly in the flapper is eliminated.

Set forth below are some embodiments of the foregoing disclosure:

Embodiment 1. A one-way valve for use in a wellbore comprising: a housing including a longitudinal axis defining a flow bore; a valve seat arranged in the housing along the flow bore; a flapper member pivotally supported in the housing between a closed position and an open position, the flapper member including a first side having a sealing surface that selectively engages the valve seat in the closed position and an opposing second side, the flapper member including a central portion that is aligned with the longitudinal axis in the closed portion and a passage extending through the flapper member; and an equalizing cartridge arranged in the passage, the equalizing cartridge including an equalizing housing and an equalizing plunger including an activation end provided at the first side of the flapper member.

Embodiment 2. The one-way valve according to any prior embodiment, further comprising: a biasing member arranged in the equalizing housing, the biasing member urging the equalizing plunger toward the first side of the flapper member.

Embodiment 3. The one-way valve according to any prior embodiment, wherein the equalizing plunger includes a first end defined by the activation end and a second end including a sealing surface that selectively seals against the equalizing housing.

Embodiment 4. The one-way valve according to any prior embodiment, wherein the equalizing plunger includes a central passage that extends from the activation end toward the second end.

Embodiment 5. The one-way valve according to any prior embodiment, wherein the central passage includes an activation end and a plurality of inlets arranged at the second end.

Embodiment 6. The one-way valve according to any prior embodiment, wherein the plurality of inlets extends substantially perpendicularly from the central passage.

Embodiment 7. A resource exploration and recovery system comprising: a surface system; a subsurface system including a tubular string extending into a formation, the tubular string being formed from one or more tubulars, at least one of the one or more tubulars supports a one-way valve comprising: a housing including a longitudinal axis defining a flow bore; a valve seat arranged in the housing along the flow bore; a flapper member pivotally supported in the housing between a closed position and an open position, the flapper member including a first side having a sealing surface that selectively engages the valve seat in the closed position and an opposing second side, the flapper member including a central portion that is aligned with the longitudinal axis in the closed portion and a passage extending through the flapper member; and an equalizing cartridge arranged in the passage, the equalizing cartridge including an equalizing housing and an equalizing plunger including an activation end provided at the first side of the flapper member.

Embodiment 8. The resource exploration and recovery system according to any prior embodiment, further comprising: a biasing member arranged in the equalizing housing, the biasing member urging the equalizing plunger toward the first side of the flapper member.

Embodiment 9. The resource exploration and recovery system according to any prior embodiment, wherein the equalizing plunger includes a first end defined by the activation end and a second end including a sealing surface that selectively seals against the equalizing housing.

Embodiment 10. The resource exploration and recovery system according to any prior embodiment, wherein the equalizing plunger includes a central passage that extends from the activation end toward the second end.

Embodiment 11. The resource exploration and recovery system according to any prior embodiment, wherein the central passage includes an outlet arranged at the activation end and a plurality of inlets arranged at the second end.

Embodiment 12. The resource exploration and recovery system according to any prior embodiment, wherein the plurality of inlets extend substantially perpendicularly from the central passage.

Embodiment 13. The resource exploration and recovery system according to any prior embodiment, wherein the one-way valve comprises a sub-surface safety valve (SSSV).

Embodiment 14. A method of equalizing pressure across a one-way valve comprising: shifting a flow tube toward a flapper member of the one-way valve; engaging, with the flow tube, an activation end of an equalizing plunger arranged in an equalizing housing provided in the flapper member; unseating the equalizing plunger from the equalizing housing; equalizing pressure across the one-way valve; and opening the flapper member with the flow tube.

Embodiment 15. The method of claim 14, wherein unseating the equalizing plunger includes compressing a spring in the equalizing housing.

Embodiment 16. The method of claim 14, wherein equalizing the pressure across the one-way valve includes directing fluid through a passage formed in the equalizing plunger.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another.

The terms "about" and "substantially" are intended to include the degree of error associated with measurement of the particular quantity based upon the equipment available at the time of filing the application. For example, "about" and/or "substantially" can include a range of 8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:
1. A one-way valve for use in a wellbore comprising:
a housing including a longitudinal axis defining a flow bore;
a valve seat arranged in the housing along the flow bore;
a flapper member pivotally supported in the housing between a closed position and an open position, the flapper member including a first side having a sealing surface that selectively engages the valve seat in the closed position and an opposing second side, the flapper member including a central portion that is aligned with the longitudinal axis in the closed portion and a passage extending through the flapper member;

an equalizing cartridge arranged in the passage, the equalizing cartridge including an equalizing housing and an equalizing plunger including an activation end provided at the first side of the flapper member, the equalizing plunger including a central passage that selectively establishes a flow path through the flapper member; and a biasing member arranged in the equalizing housing about the equalizing plunger, the biasing member being arranged radially outwardly of the central passage.

2. The one-way valve according to claim 1, wherein the biasing member urges the equalizing plunger toward the first side of the flapper member.

3. The one-way valve according to claim 1, wherein the equalizing plunger includes a first end defined by the activation end and a second end including a sealing surface that selectively seals against the equalizing housing.

4. The one-way valve according to claim 3, wherein the central passage extends from the activation end toward the second end.

5. The one-way valve according to claim 4, wherein the equalizing plunger includes a plurality of inlets arranged at the second end.

6. The one-way valve according to claim 5, wherein the plurality of inlets extends substantially perpendicularly from the central passage.

7. A resource exploration and recovery system comprising:
a surface system;
a subsurface system including a tubular string extending into a formation, the tubular string being formed from one or more tubulars, at least one of the one or more tubulars supports a one-way valve comprising:
a housing including a longitudinal axis defining a flow bore;
a valve seat arranged in the housing along the flow bore;
a flapper member pivotally supported in the housing between a closed position and an open position, the flapper member including a first side having a sealing surface that selectively engages the valve seat in the closed position and an opposing second side, the flapper member including a central portion that is aligned with the longitudinal axis in the closed portion and a passage extending through the flapper member;

an equalizing cartridge arranged in the passage, the equalizing cartridge including an equalizing housing and an equalizing plunger including an activation end provided at the first side of the flapper member, the equalizing plunger including a central passage that selectively establishes a flow path through the flapper member; and a biasing member arranged in the equalizing housing about the equalizing plunger, the biasing member being arranged radially outwardly of the central passage.

8. The resource exploration and recovery system according to claim 7, wherein the biasing member urges the equalizing plunger toward the first side of the flapper member.

9. The resource exploration and recovery system according to claim 7, wherein the equalizing plunger includes a first end defined by the activation end and a second end including a sealing surface that selectively seals against the equalizing housing.

10. The resource exploration and recovery system according to claim 9, wherein the central passage that extends from the activation end toward the second end.

11. The resource exploration and recovery system according to claim 10, wherein the equalizing plunger includes a plurality of inlets arranged at the second end.

12. The resource exploration and recovery system according to claim 11, wherein the plurality of inlets extend substantially perpendicularly from the central passage.

13. The resource exploration and recovery system according to claim 7, wherein the one-way valve comprises a sub-surface safety valve (SSSV).

14. A method of equalizing pressure across a one-way valve comprising:
shifting a flow tube toward a flapper member of the one-way valve;
engaging, with the flow tube, an activation end of an equalizing plunger having a central passage arranged in an equalizing housing provided in the flapper member;
unseating the equalizing plunger by compressing a spring arranged radially outwardly of the central passage;
equalizing pressure across the one-way valve through the central passage; and
opening the flapper member with the flow tube.

* * * * *